Jan. 4, 1927.
R. R. ROBERTSON
COPYING CAMERA
Filed June 2, 1923   3 Sheets-Sheet 1
1,612,987
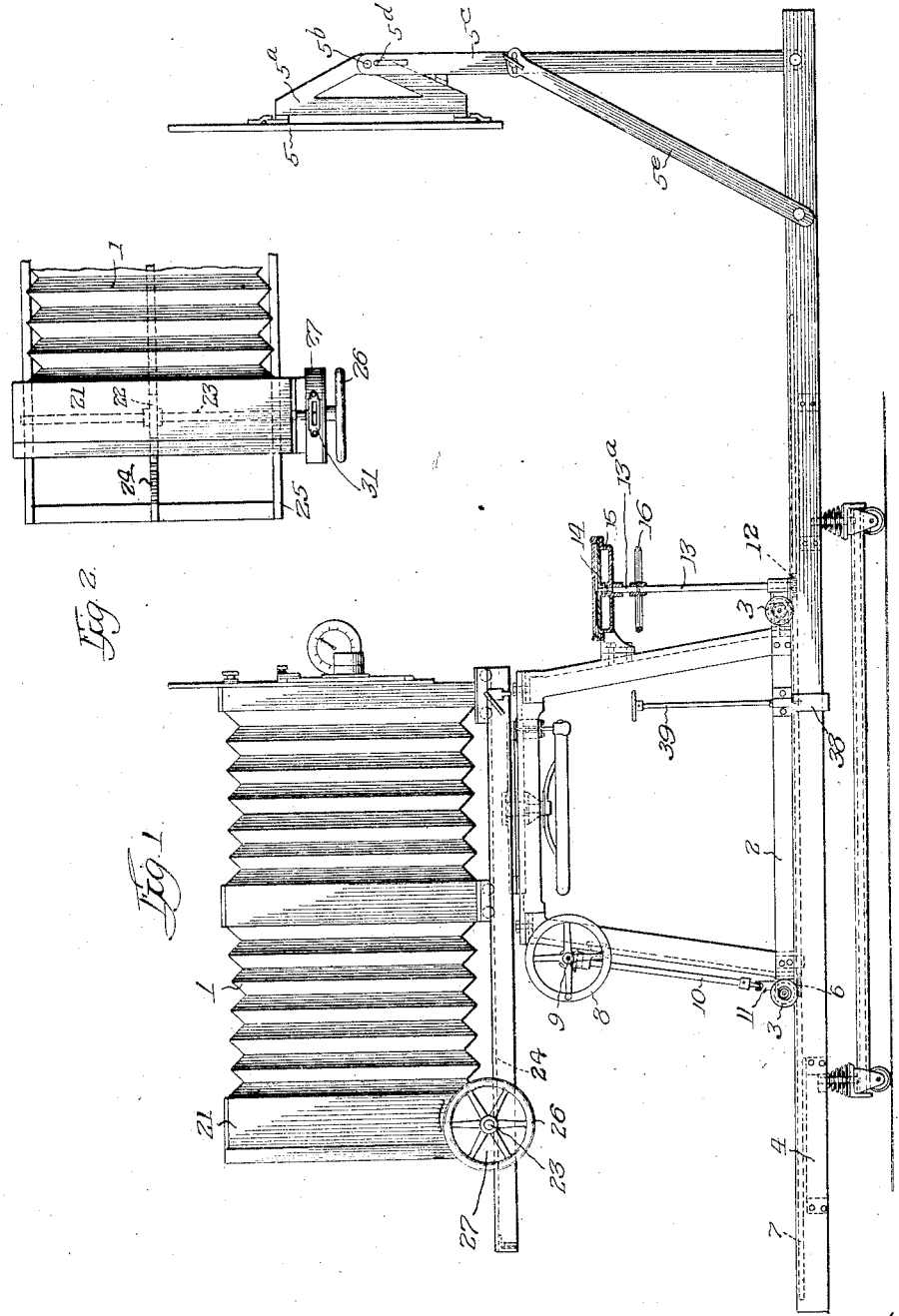

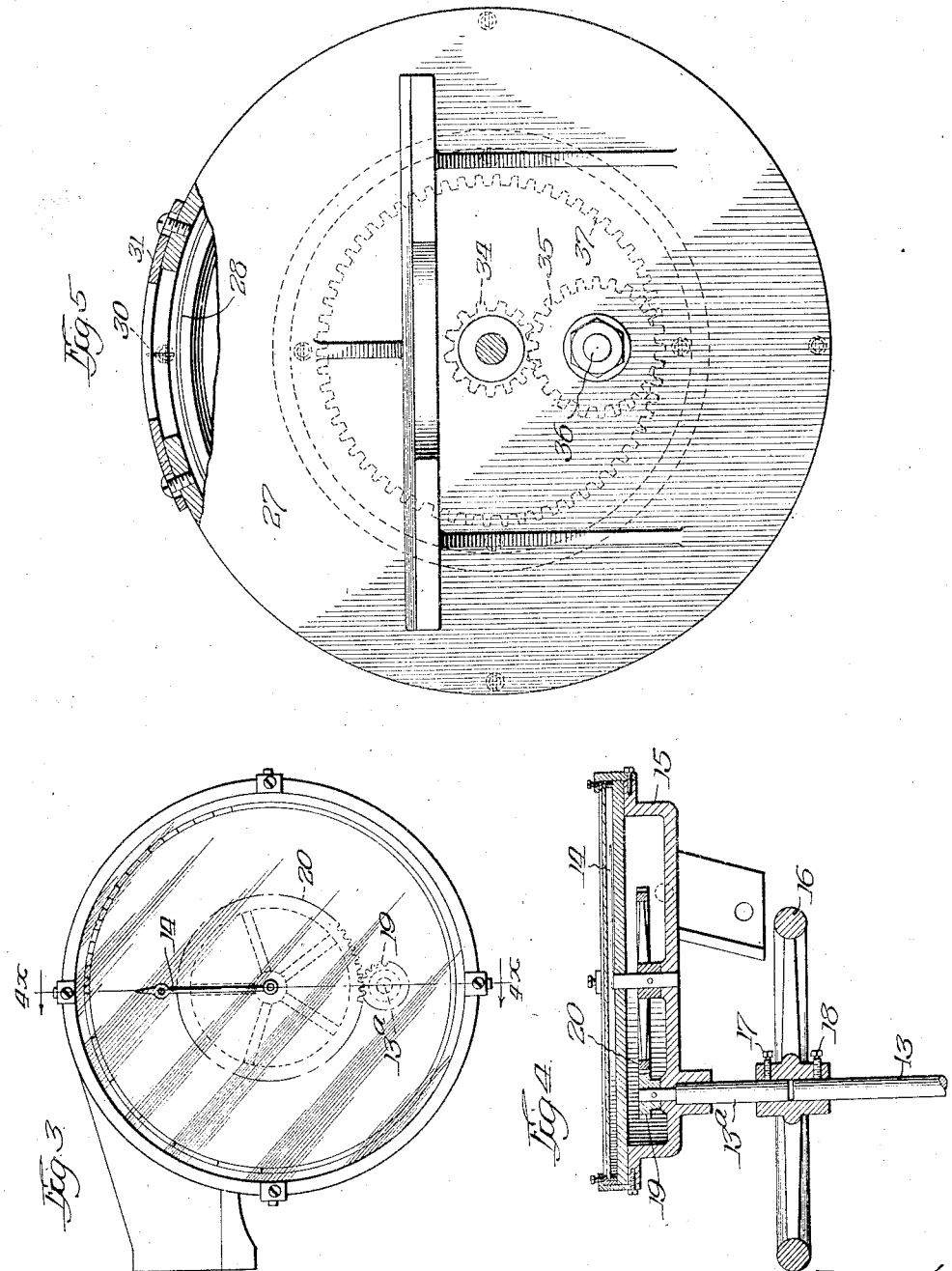

Jan. 4, 1927.
R. R. ROBERTSON
COPYING CAMERA
Filed June 2, 1923
1,612,987
3 Sheets-Sheet 3
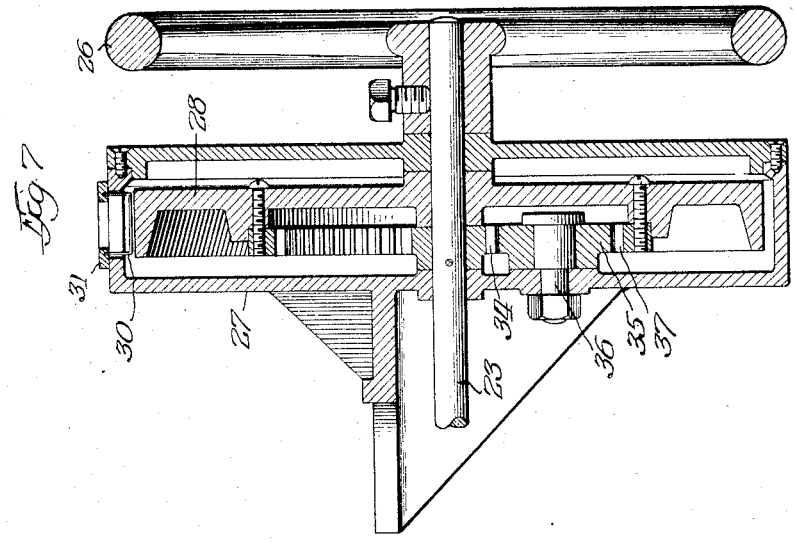
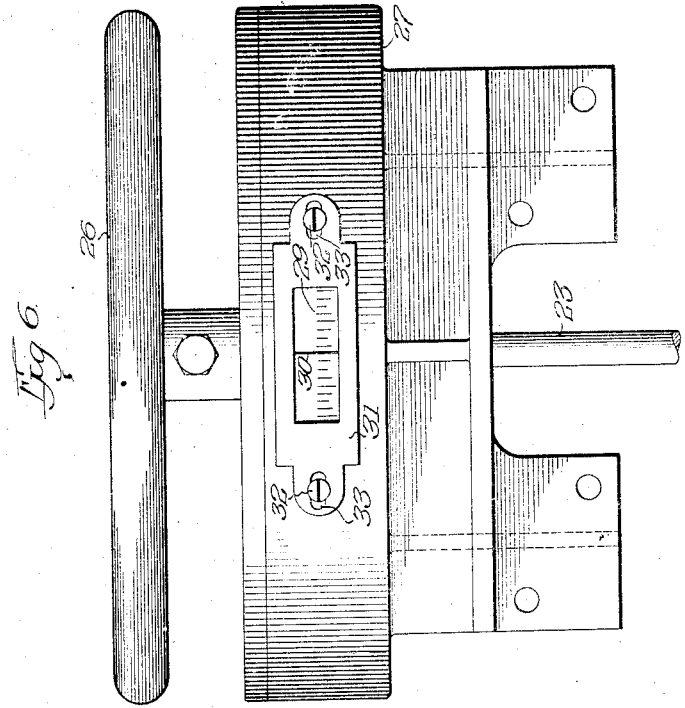

Patented Jan. 4, 1927.

1,612,987

UNITED STATES PATENT OFFICE.

ROBERT R. ROBERTSON, OF EVANSTON, ILLINOIS.

COPYING CAMERA.

Application filed June 2, 1923. Serial No. 642,987.

This invention relates to copying cameras of the same general nature as that set forth in application Serial No. 552,213, filed by me on April 13, 1922, according to which, among other novel features, the distance of the lens from the copy board, and consequent proportions of reproduction; are indicated by a distance indicator traveling with the camera and actuated by a positive connector attached to the copy board; the distance of the focal plane from the lens is indicated by another indicator actuated commensurately with and preferably by the same means which develops relative movement of the focusing frame from the bed; and both these indicators are calibrated in like terms so that correspondence of reading upon the two will indicate that the adjustment of focus is appropriate to the distance from the copy. The present invention has for its object to improve the means for positioning the camera with relation to the copy board and correspondingly changing the focus of the camera to agree with its position.

According to one feature of the present invention, positive connection between the distance gauge and the copy board consists of a track upon which the carriage which carries camera is mounted to travel, and a connection through which the distance indicator is revolved in its movement relatively to the track, the copy board being suitably mounted at the end of this track or upon a frame forming part of the same; additional features incident thereto consisting in the particular means for establishing driving connection between the distance indicator and the track, two independent rack and pinion driving means for moving the camera carriage upon the track, one of which may be employed for rough adjustment of the carriage, and the other of which serves for fine adjustments and is completely associated with the distance gauge, as, for instance, by mounting a hand wheel upon the shaft of the distance gauge and having the same rack and pinion connection which drives the gauge impart movements to the carriage when the shaft is driven by said hand wheel, said two driving connections for the carriage being so located that at least one of them will be on the fixed end of the camera and means for properly zeroizing or determining initial adjustment of the indicator with relation to the track in order to justify the readings.

Another feature of the invention resides in an indicator directly associated with the means for imparting movements to the focusing frame, and particularly an indicator associated immediately with a revolving shaft which carries a driving element which develops the focusing movement. Other features incident to this part of the invention reside in the particular construction of the focusing indicator and the means through which it is associated with the focusing drive.

Still another feature of the invention consists in so regulating the distance-regulating drive to the focusing drive that the two may be manipulated simultaneously and their indicators readily observed during manipulation.

The invention consists in the novel features of construction and arrangements set forth in the following specification and particularly pointed out in the claims, the detailed description being understood to relate to the preferred construction selected for illustration, and the terms of the claims being relied upon to define the scope of the invention.

In the accompanying drawings—

Figure 1 is a side elevation of a camera embodying the features of the invention.

Figure 2 is a plan view of the means for developing the focus.

Figures 3 and 4 are, respectively, a plan view and a vertical section on the line 4×—4× of Figure 3, showing the construction of the distance indicator; and Figures 5, 6, and 7 are, respectively, an inner side elevation, a plan view, and a vertical axial section showing the focusing drive wheel and its related indicator.

1 represents a camera of any suitable construction, 2 a carriage upon which it is mounted and which is adapted through means of wheels 3 to traverse a track 4, and 5 represents a copy board in fixed relation to the track 4 and to and from which the camera is adjusted by the movements of the carriage 2 upon said track. In order to impart rough adjustments to the carriage 2 on the track 4, a pinion 6 is caused to engage with a rack 7, and this pinion is adapted to be rotated by hand wheel 8 preferably located near the rear end of the carriage acting through the medium of bevel gears 9. shaft 10, and universal joint 11. Likewise in engagement with the rack 7 is a pinion 12 on a shaft 13 which causes rotation of said shaft as the carriage travels upon its track; and this shaft drives the pointer 14 of an indicator 15 which registers the distance of the lens of the camera from the copy board. In order to adapt the rack and pinion connection 7, 12, and shaft 13 for use as a fine adjustment of the camera carriage upon the track, shaft 13 is provided with a hand wheel 16 convenient for prehension while the operator is in a position of close observation of the indicator 14, as, for instance, by bending over the indicator while grasping the wheel 16 with his two hands; and in order to zeroize the indicator 15 or bring its indicator into exact registry with the distance that it is intended to indicate, means are provided for shifting the pointer 14 independently of the driving gear 12, and this means preferably consists of the hand wheel 16 which splices a joint between the shaft 13 and its extension 13ª with which the wheel is connected by means of set screws 17 and 18 (see Fig. 4). By loosening the screw 18 the extension 13ª with the pointer 14 can be rotated at will to justify the indicator. Preferably, the extension 13ª drives the pointer 14 through means of the reducing gear wheels 19 and 20.

In order to adjust the focusing section of the camera which in the present illustration is the plate holder section 21, a pinion 22 on shaft 23, mounted upon said section, is made to engage with a fixed rack 24 carried upon the bed 25 of the camera upon which said section is adapted to travel, and said shaft 23 extends laterally to a point at a convenient distance from the camera where it receives a hand wheel 26 through which the shaft may be rotated in determining focusing movements. Supporting this end of the shaft 23 is a combined bracket and indicator housing 27 (Figs. 5, 6 and 7) attached to the undersurface of the focusing section, and within the housing and coaxial with said shaft is arranged a cylindrical disk 28 having upon its periphery graduations 29 which are moved by the rotation of the disk relatively to a reading line 30 carried by the housing. Reading line 30 is preferably in the form of a U-shaped wire depending from an adjusting plate 31 into close relation to the graduations on the disk; and said plate 31 is secured in position by screws 32 passing through slots 33, so that the reading line can be properly adjusted for zeroizing or initial reading correction.

The disk 28 is not driven directly by the shaft 23 but indirectly through the medium of a pinion 34 fixed upon the shaft and an idler 35 journaled at 36 and meshing with the internal annular rack 37 which is carried by the indicator disk.

38 represents a track grip adapted to be adjusted by hand shaft 39 for firmly locking the carriage 2 in any position to which it may be adjusted upon the track 4.

The calibrations on the two indicators 14 and 28 will be indexed in the same terms, applied thereto in such manner that whenever the same reading appears on both indicators, the focusing adjustment will be appropriate to the distance adjustment, as described and claimed in my previous application hereinbefore identified.

The copy board 5 is preferably maintained through the medium of a tilting table 5ª pivoted at 5ᵇ upon the uprights 5ᶜ, an arresting stop 5ᵈ being provided to hold it either in vertical or horizontal position; and in order to insure the vertical position, braces 5ᵉ are arranged to connect the uprights 5ᶜ with the bed 4 upon which the copy holder is mounted.

I claim:

1. In photographic copying apparatus, a carriage adapted to support a camera, a track upon which said carriage runs, a rack mounted on said track, two pinions mounted on the carriage and coacting with said rack, means for driving one of said pinions, an indicator actuated by the other of said pinions and independent means directly associated with said other pinion for manually driving the same and imparting movement to the carriage.

2. In photographic copying apparatus, a track, a carriage mounted to travel on said track, a camera supported on and moving bodily with said carriage and having focusing movement upon the carriage, means for positively moving the camera to focus it, and means for positively driving the carriage upon its track to determine the location of the camera as a whole; said camera and carriage being provided with indicators adapted to show movements imparted to them, respectively the indicator indicating the movement of the carriage being independent of the means for driving the carriage and having manual means associated therewith for imparting fine adjustment to the carriage.

3. In photographic copying apparatus, a track, a carriage movably mounted on said track, a camera mounted on and bodily movable with said carriage, and an indicator for showing movement of the carriage upon the track comprising a shaft driven in the movements of the carriage and a pointer driven by said shaft; said shaft being divided having one of its portions in driving relation to said pointer and having means for imparting independent movement thereto for correcting the pointer.

Signed at Chicago, Ill., this 29th day of May, 1923.

ROBERT R. ROBERTSON.